US012738177B2

(12) United States Patent
J et al.

(10) Patent No.: US 12,738,177 B2
(45) Date of Patent: Sep. 15, 2026

(54) SYSTEMS AND METHODS FOR CONTEXT-BASED COCKPIT SIMULATION

(71) Applicant: Honeywell International Inc., Charlotte, NC (US)

(72) Inventors: Kirupakar J, Madurai (IN); Kalimulla Khan, Bangalore (IN); Dhivagar Palanisamy, Cumming, GA (US); Saravanakumar Gurusamy, Bangalore (IN); Ramkumar Rajendran, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 730 days.

(21) Appl. No.: 18/172,503

(22) Filed: Feb. 22, 2023

(65) Prior Publication Data

US 2024/0194089 A1 Jun. 13, 2024

(30) Foreign Application Priority Data

Dec. 7, 2022 (IN) ............................. 202211070545

(51) Int. Cl.
*G09B 9/16* (2006.01)
*G08G 5/21* (2025.01)

(52) U.S. Cl.
CPC ............... *G09B 9/165* (2013.01); *G08G 5/21* (2025.01)

(58) Field of Classification Search
CPC ................................. G09B 9/165; G08G 5/21
See application file for complete search history.

(56) References Cited

U.S. PATENT DOCUMENTS

| | | | | |
|---|---|---|---|---|
| 10,616,241 | B2 * | 4/2020 | Toews | G06F 11/0796 |
| 11,176,832 | B2 * | 11/2021 | Mohan | G08G 5/26 |
| 11,856,111 | B2 * | 12/2023 | Mohan | G07C 5/008 |
| 12,394,320 | B2 * | 8/2025 | Janakiraman | G08G 5/57 |
| 2024/0194089 | A1 * | 6/2024 | J | G08G 5/21 |

* cited by examiner

*Primary Examiner* — Xuan M Thai
*Assistant Examiner* — Sadaruz Zaman
(74) *Attorney, Agent, or Firm* — Alston & Bird LLP

(57) ABSTRACT

A system includes a communication device, a display, an input/output interface, a processing device, and a memory, storing one or more instructions that cause the system to: receive electronic flight book (EFB) selection information for selecting one EFB GUI from a plurality of selectable EFB GUIs that provide an interface for entry and display of flight information; select one EFB GUI from the plurality of selectable EFB GUIs based on the received EFB selection information; display the selected EFB GUI on the display; receive one or more flight parameters from a flight management system (FMS); display one or more of the one or more flight parameters on the displayed EFB GUI; receive one or more changes to the one or more flight parameters via the input/output interface; and update one or more of the one or more flight parameters in the FMS based on the received one or more changes.

17 Claims, 12 Drawing Sheets

200
30
20
22
10
40
24
50

SYSTEMS AND METHODS FOR CONTEXT-BASED COCKPIT SIMULATION

CROSS-REFERENCE TO RELATED APPLICATION(S)

This application claims the benefit of priority to Indian Application No. 202211070545, filed on Dec. 7, 2022, the entirety of which is incorporated by reference herein.

TECHNICAL FIELD

Various embodiments of the present disclosure relate generally to the field of aircraft systems, and more particularly, to systems and methods for context-based cockpit simulation.

BACKGROUND

Aircraft flights may involve extensive data input and planning before any given flight. This data and planning can be performed on aircraft-connected systems such as a flight management system (FMS) aboard the aircraft. Indeed, crews of aircraft can spend significant time preparing for a flight using FMS and other on-board aircraft systems (e.g., on-board electronic flight books (EFB) and other systems) to plan and prepare for the flight. However, no system currently exists for accurately mimicking multiple types of aircraft cockpit and the systems related to aircraft operation on a remote tool. Systems which may currently exist are not tailored to a specific cockpit or aircraft platform and can require entry of redundant and unnecessary information in a format that is unfamiliar to a pilot or crew that will be operating a familiar aircraft. This can result in a pilot and/or crew performing all steps of initial aircraft and flight preparation locally at the specific aircraft before the flight and/or remotely using inaccurate and inefficient tools.

Further, EFBs may be displayed or planning on a remote device, for example, a personal electronic device (PED) and may be used by aircrews for inputting critical regulatory, flight planning, and other information in preparation for and during a flight. However, these PED-displayed EFBs may not be customized (e.g., in a display format, etc.) based on a particular type of aircraft. That is, if a crew is using an EFB tool, the graphical user interface (GUI) of the PED-displayed EFB does not match the in-cockpit EFB displayed to the crew during flight. This discontinuity between EFBs displayed remotely and in a cockpit may result in additional crew training, under utilization of remote devices, and an increased likelihood of errors. Accordingly, systems and methods for context-based cockpit simulation may be required.

SUMMARY OF THE DISCLOSURE

According to certain aspects of the disclosure, methods and systems are disclosed for context-based cockpit simulation.

For instance, in one embodiment, a system includes a communication device, a display, an input/output interface, a processing device, and a memory, storing one or more instructions that when processed by the processing device, cause the system to: receive electronic flight book (EFB) selection information for selecting one EFB GUI from a plurality of selectable EFB GUIs that provide an interface for entry and display of flight information and are stored in the memory; select one EFB GUI from the plurality of selectable EFB GUIs based on the received EFB selection information; display the selected EFB GUI on the display; receive one or more flight parameters from a flight management system (FMS); display one or more of the one or more flight parameters on the displayed EFB GUI; receive one or more changes to the one or more flight parameters via the input/output interface; and update one or more of the one or more flight parameters in the FMS based on the received one or more changes.

In another embodiment, a system includes a communication device, a display, an input/output interface, a processing device, and a memory, storing one or more instructions that when processed by the processing device, cause the system to: display a cockpit clone on the display, wherein the cockpit clone is configured to change settings of an avionics engine and is a visual representation of an actual cockpit of an aircraft; receive an input to a setting of the avionics engine via the input/output interface to change the setting of the avionics engine; connect to a flight management system (FMS) using the communication device; and upload the changed setting of the avionics engine to the FMS to change an actual aircraft setting of an actual aircraft based on the setting of the avionics engine.

In yet another embodiment, a method includes receiving electronic flight book (EFB) selection information for selecting one EFB GUI from a plurality of selectable EFB GUIs that provide an interface for entry and display of flight information and are stored in a memory, selecting one EFB GUI from the plurality of selectable EFB GUIs based on the received EFB selection information, displaying the selected EFB GUI on the display, receiving one or more flight parameters from a flight management system (FMS), displaying one or more of the one or more flight parameters on the displayed EFB GUI, receiving one or more changes to the one or more flight parameters via an input/output interface, and updating one or more of the one or more flight parameters in the FMS based on the received one or more changes.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of managing aircraft missions and, more particularly, to systems and methods for self-contained mission management. While this disclosure describes the methods and systems with reference to aircraft, it should be appreciated that the present methods and systems may be applicable to various other vehicles (e.g., automobiles, transport vehicles, transit vehicles, urban air mobility (UAM) hybrid vertical takeoff and landing (VTOL) vehicles, etc.)

Because aircraft missions can require modification so rapidly based on various factors (e.g., weather, equipment requirements, passenger emergency, etc.) and because modifications to missions require careful input and review from aircraft crew, an automated, self-contained mission manager is often involved. The automated, self-contained mission manager may receive inputs from various internal and external systems to modify a current planned mission to a modified state in response to an emergent requirement. The following description provides details associated with systems and methods for such automated mission management.

Figure 1:
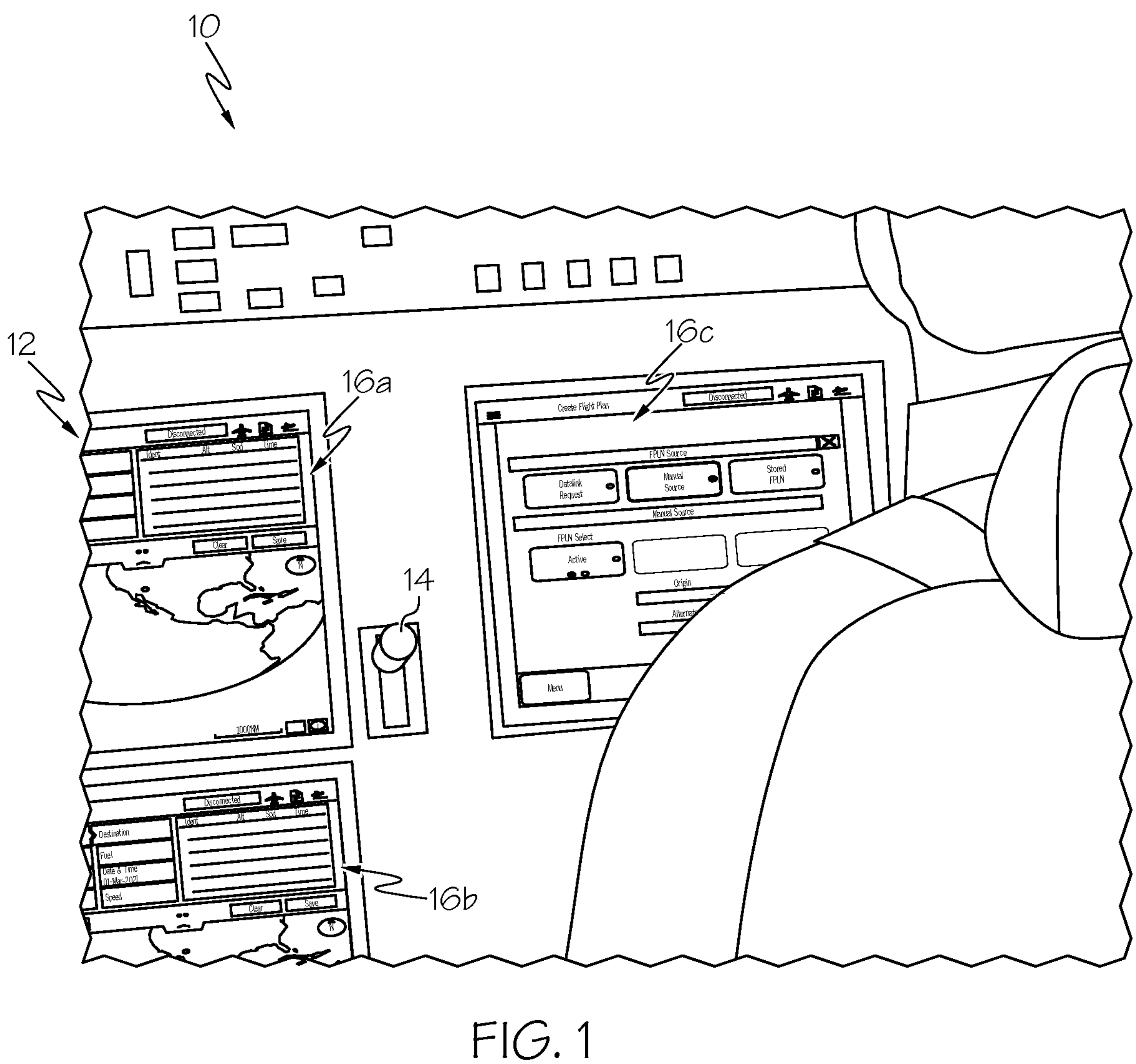
FIG. 1 depicts an exemplary cockpit of an aircraft including a plurality of displays, which may be used to display outputs of one or more avionics systems and an exemplary electronic flight bag, according to one or more embodiments.

FIG. 1 depicts an exemplary cockpit 10 of an aircraft including a plurality of displays 12 and control systems 14 for displaying visual outputs from one or more avionics systems, aircraft sensors, communication systems, and other aircraft-related systems and for controlling one or more systems aboard an aircraft. The aircraft control systems and other aircraft related systems may be automatically controlled, remotely controlled, and/or manually controlled (e.g., by one or more pilots and/or crew of the aircraft). The displays 12 may provide visual information to the crew in order to make decisions regarding the operation of the aircraft and for other reasons related to aircraft and related systems control. The control system 14 may be operable by the crew in order to control the aircraft systems. In some embodiments, the aircraft may include a flight management system (FMS), an electronic flight bag (EFB), one or more sensing systems (e.g., radar, LiDAR, weather sensors, etc.) and other systems which may be displayed in the cockpit 10 on the displays 12. The displays 12 may be input/output devices (e.g., touchscreen devices) capable of receiving a user input (e.g., from the pilot(s)) in addition to providing visual information. The cockpit may further include one or more audio and/or haptic systems (not shown) for providing audio information to the crew (e.g., one or more alarms).

Figure 2:
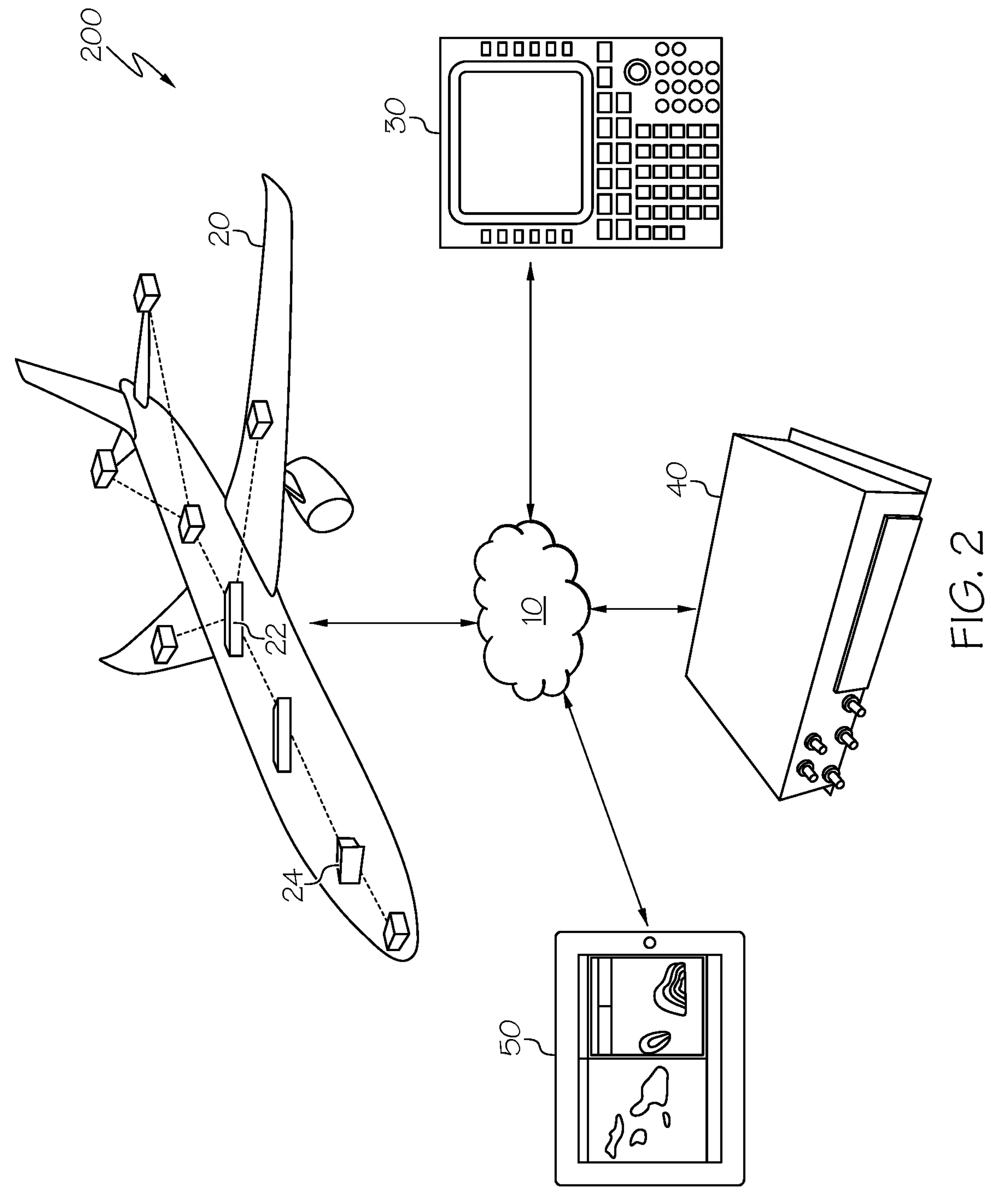
FIG. 2 depicts an exemplary aircraft-based network system architecture for the aircraft of FIG. 1.

Referring to FIG. 2, a network environment embodied as system 200 for context-based display of cockpit simulation is shown. The network environment includes an aircraft 20, which may include an aircraft-based data gateway ("ADG") 22 that may couple to a plurality of avionics line-replaceable units (LRU) 24, one or more flight management systems (FMS) 30, one or more network routers 40, one or more personal electronic devices (PED) 50, and other systems. The various systems may connect to a data network 10 (e.g., a cloud network) via one or more communications systems aboard the aircraft 20 (e.g., a SATCOM system, an HF communications system, a VHF communications system, a FOMAX/AoIP system, etc.)

The ADG 22 may enable real-time wireless distribution of databases, loadable software, flight data, and passenger traffic enhancing aircraft and flight efficiencies, and may enhance connections to EFB applications for pilots from ground servers, for example, while the aircraft 20 is grounded or via SATCOM or other communications devices while in flight. The EFB may be displayable on the PED 50 in a customizable display and may include, for example, one or more charts, graphs, data related to the operation of the aircraft, and/or regulatory requirements associated with operating the aircraft. The ADG 22 may be, for example, a single unit or multiple units that act as a gateway for all data that flows into and out of the aircraft. The ADG 22 may connect the EFB to aircraft systems and parameters to further enable applications as described herein.

The one or more LRUs 24 may be one or more modular components that may be designed to be replaced quickly at an operating location (e.g., a first line). Each avionics LRU 24 may be a sealed unit such as, for example, a radio, a radar, a sensor, a traffic control unit, a weather unit, or other auxiliary equipment that can be stocked and replaced quickly to restore a mobile systems to service. The avionics LRUs 24 may include communications, navigation, display and management systems, and any other of the various systems that are fitted to an aircraft to perform individual functions. The avionics LRUs may assist with and provide crews access to systems enabling, for example, published routes and procedures for improved navigation and routing, negotiated trajectories thus adding data communications to create preferred routes dynamically, delegated separation for enhanced situational awareness in the air and on the ground, low visibility/ceiling approach/departure for enabling operations with weather constraints with less ground infrastructure, surface operations to increase safety in approach and departure, and air traffic management (ATM) efficiencies to improve the ATM process.

The FMS 30 may be a specialized computer system that may automate various in-flight tasks. One function of the FMS 30 may be, for example, to manage the flight plan for any given flight. The FMS 30 may receive input from various sensors and systems (not shown), such as, for example, a GNSS system, an INS system, a radio navigation system, etc. to determine the aircraft's position. Using the sensors and systems, the FMS 30 may guide the aircraft along a given flight plan (e.g., to New York from Amsterdam). The FMS 30 may be controlled, for example, through a Control Display Unit (CDU) which CDU may be located at one or more locations throughout the aircraft (e.g., in a cockpit) and may incorporate various input/output devices (e.g., a small screen and keyboard and/or touchscreen). In some embodiments, a digital clone of one or more systems of the FMS 30 (e.g., the CDU) may be reproduced at the PED 50 as a cloned cockpit or other digital clone based on an avionics engine stored in the network 10 and/or the PED 50. The FMS 30 may send a flight plan for display to an Electronic Flight Instrument System (EFIS), Navigation Display (ND), or Multifunction Display (MFD), which systems and displays could be displayed and maniputed using, for example, an input/output device (e.g., in the cockpit 10) or on the PED 50 from anywhere with a connection to the network 10. In some embodiments, even when the PED 50 is not connected to the network 10, it may save one or more changes locally and upload the changes to the network 10 upon connection to the network 10. In some embodiments, the FMS 30 may include, as one example, a flight management computing device, a control display unit, and a cross talk bus.

Still referring to FIG. 2, the FMS 30 may be communicatively coupled to a flight data system (FDS), which FDS may include, for example, one or more gateways that are configured to receive data from one or more aircraft systems (e.g., the radar system, an engine system, an auxiliary power unit, wheel systems, brake systems, navigation, collision avoidance, flight recorders, automatic traffic control systems, etc.) and sensors (e.g., flow sensors, pressure sensors, temperature sensors, altimeters, airspeed indicators, position sensors, oxygen sensors, force sensors, vibration sensors, compasses, magnetometers, gyroscopes, altitude heading sensors, tachometers, etc.) to record data generated by the aircraft during flight. The FDS can include one or more modules configured to enact one or more of its processes. For example, the FDS may include a network server platform, a network server device manager, an action handler module, a domain analytic applications module, a data store, a cloud connector module, a rules engine module, a bus management module, a node agent module, a data ingress/egress module(s), an edge analytics software development kit (SDK), a data bus, and one or more software API modules (e.g., a python API, a Linux API, etc.) The FDS may acquire, record, download, and analyze data in order to make one or more recommendations to the operators of the aircraft in real time.

The network router(s) 40 may be distributed throughout an aircraft in a distributed architecture which can provide optimum coverage through a cabin and flight deck and provide redundancy to the various devices and systems throughout the cabin and flight deck. The network router(s) 40 may be compatible with a range of satellite communications systems including satellite networks. The network route(s) 40 may be configurable to work as a router, wireless access port, data loader, and/or electronic flight bag connection.

The PED 50 may include and/or be communicatively coupled to one or more processors and memories storing instructions that are configured such that the PED can host applications that enable a crew of the aircraft 20 to perform functions associated with operating the aircraft 20. For example, using the EFB applications on the PED 50, the crew may perform basic through advanced flight planning calculations and display various documentation, including navigational charts, operations manuals, and aircraft operational and administrative checklists. The EFBs for use with the PED may be certified as part of the aircraft avionics system(s) operating on board the aircraft 20 and may be integrated with the aircraft systems such as the FMS 30 such that input to one avionics systems can be used to update the others and vice versa. The PED 50 can receive, for example, one or more inputs from a position tracking system (e.g., GNSS) to be used in flight or while on the ground to display an aircraft's position on navigational charts. The PED 50 can depict real-time weather information based on one or more connections to a weather system. In some embodiments, the PED 50 may be one or more of a tablet device, a mobile computing device (e.g., a smartphone), and/or a virtual reality (VR) headset.

Figure 3:
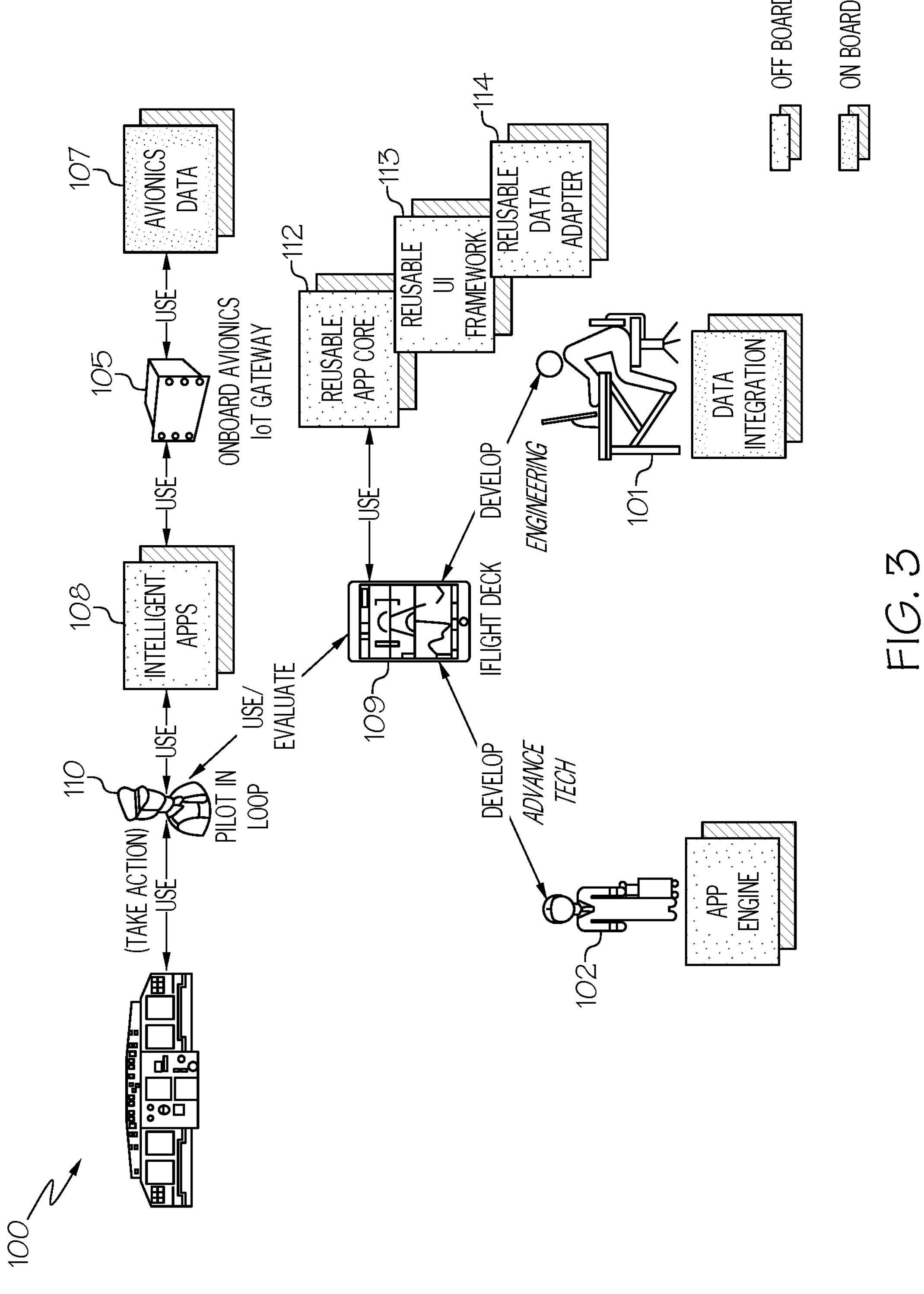
FIG. 3 depicts an exemplary diagram of a data flow for an exemplary aircraft-based network system.

FIG. 3 depicts exemplary avionics and related connected systems which may be connected in a data flow 100, according to one or more embodiments. In step 101, an operator and/or engineer may use "data integration" engines to develop rules and/or one or more applications ("Engineering") using an integrated flight deck (IFD) 109, which can be a cloud based dashboard and may be displayed, for example, using the PED 50 of FIG. 2. In step 102, a safety officer and/or flight data analysis may use an app engine to develop SDKs ("Advance Tech") that configure one or more applications, such as, for example, self-contained mission managers, virtual electronic flight books, or cloned cockpit dashboards in the IFD 109. In steps 112, 113, and 114, a reusable app core 112, reusable user interface framework 113, and reusable data adapter 114, respectively, may pack metadata and send that metadata to edge hardware via IFD 109 (e.g., using an orchestrator of a networked computing system, as discussed more particularly herein). In step 105, an onboard gateway (e.g., the avionics IoT gateway 105 of FIG. 3) may deliver avionics data 107 to an edge analytics software development kit (SDK) associated with intelligent apps 108. The avionics data 107 may be consumed data through the SDK of intelligent apps 108, at step 105. As used herein, avionics data can refer to data generated by one or more avionics systems including, for example, communications, navigation, display and management systems, aircraft flight control systems, fuel systems, collision avoidance (e.g., airborne and ground) systems, flight recorders, weather systems, and aircraft management systems. The onboard intelligent applications 108 may be configured to consume the avionics data 107 via the onboard avionics IoT gateway (step 105) to deliver one or more inferences, suggestions, or recommended actions to pilot 110 and/or crew of the aircraft using the IFD 109 (e.g., one or more actions that the pilot can take or the aircraft can perform to result in changing a flight operation, such as flight operation savings. Flight operation savings can be directed towards safety, maintenance, weather related operations, fuel conservation, resource management, etc. An actionable update (e.g., a sync) may then be made to system 111. In some embodiments, the actionable inferences, recommendations, and suggestions along with additional information may be provided to an electronic flight bag application and/or one or more external or internal applications by the aircraft data gateway.

Figure 4A:
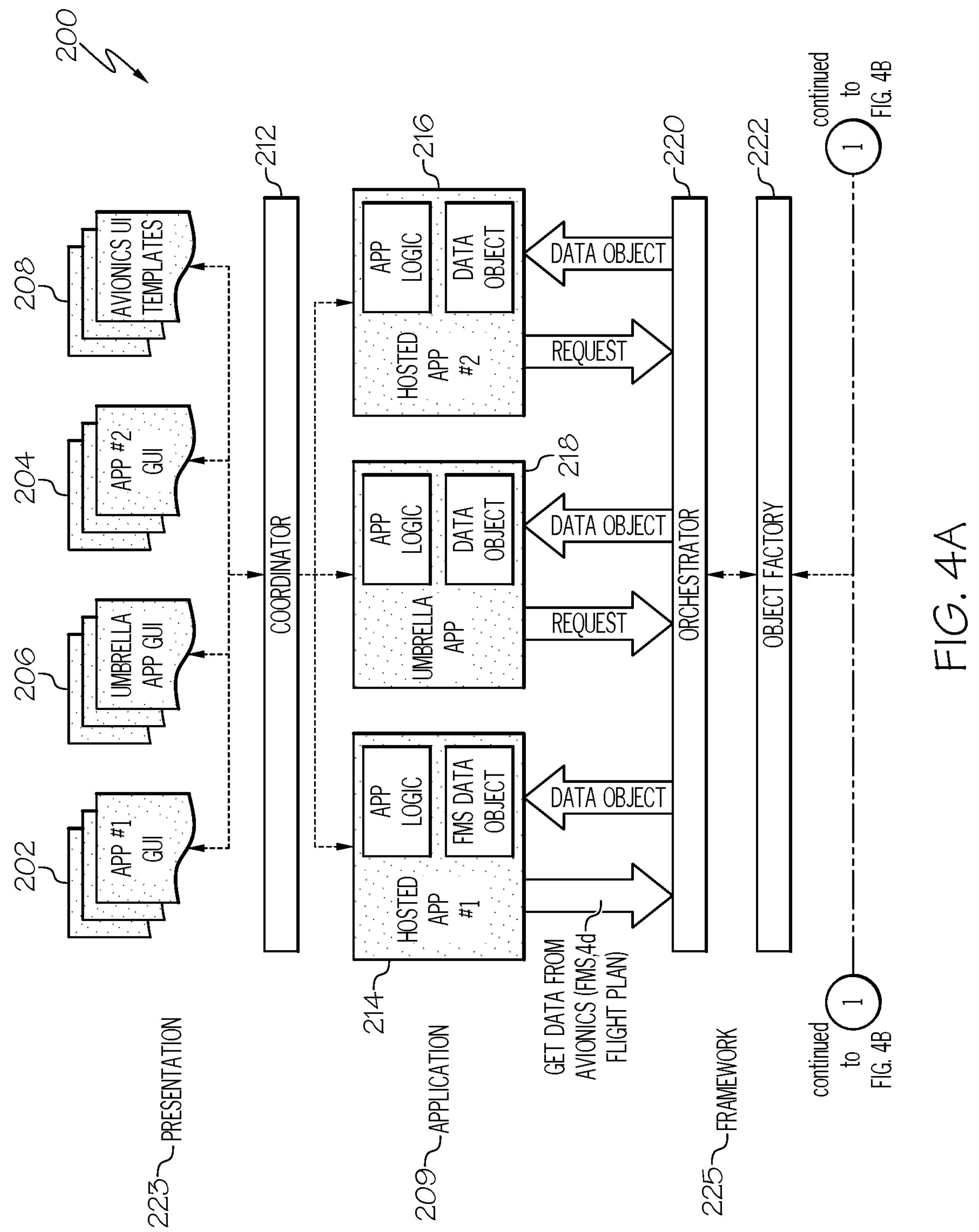
FIG. 4A depicts a portion of a schematic block diagram of a framework of a platform of the networked computing system environment of FIG. 2.
Figure 4B:
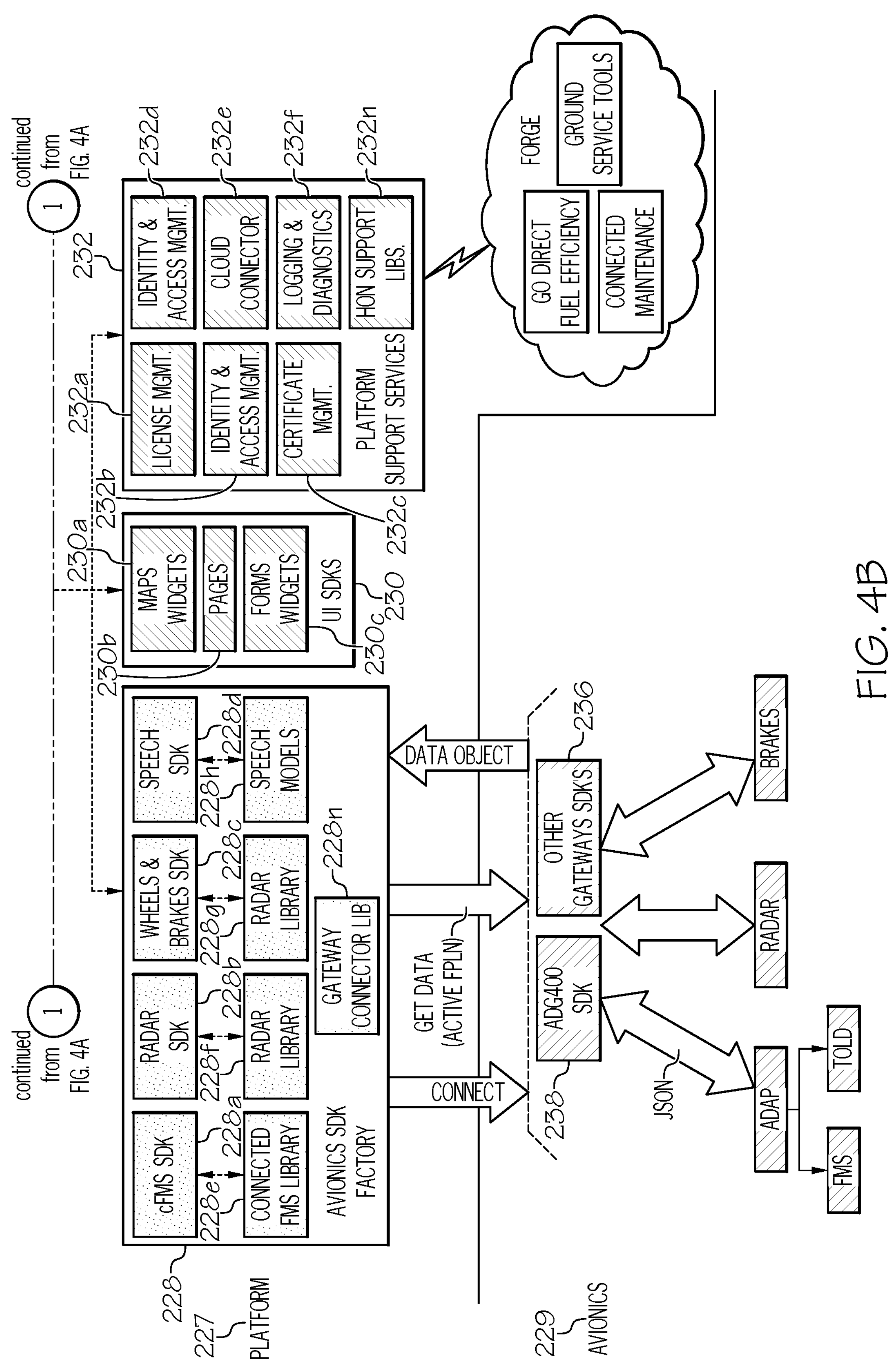
FIG. 4B depicts a portion of a schematic block diagram of a framework of a platform of the networked computing system environment of FIG. 2.

FIG. 4A and FIG. 4B depict an exemplary high-level architecture of herein disclosed system 200. Specifically, system 200 describes an example IFD platform configured to provide end-to-end real-time data acquisition (e.g., to provide real-time flight insights and maintenance alerting) with seamless access to data from multiple and at times different or varying data sources (e.g., data from avionics data sources) and flexibility to configure events or report fault events. System 200 includes advanced fault detection logic that can be incorporated to identify anomalies without the constraint of computational power and data access. In turn, real-time detection helps end users (e.g., flight crew) to perform self-contained mission management and/or to take corrective actions to prevent operational disruptions.

As shown in FIG. 4A and FIG. 4B, the overall architecture of system 200 is illustrated including the SDK components and corresponding framework. System 200 uses real-time accurate models and visual analytics to deliver one or more cloned dashboards and/or virtual EFBs locally and/or remotely, during ground operations, inflight, and in real-time to the end user (e.g., a pilot, flight crew, etc.). System 200 is extensible and portable for deployment in any cloud or data center environment for providing an enterprise-wide, top to bottom view, displaying the status of processes, assets, people, and safety. System 200 includes a collection of framework components, SDKs, UI libraries, and rules that specify how applications are developed from the platform and how additional SDKs and UI libraries can be added to the platform. Further, system 200 supports end-to-end capability to execute digital twins (e.g., a digital avionics engine) against process data and to translate the output into actionable changes to one or more avionics systems as detailed further below.

Computer systems of system 200 may include any type or quantity of one or more processors and one or more data storage devices including memory for storing and executing applications or software modules. In one embodiment, the processors and data storage devices are embodied in server-class hardware, such as enterprise-level servers. For example, the processors and data storage devices may include any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the system 200.

The computer systems of system 200 are configured to receive and transmit data between other components to produce a desired technical result. In one embodiment, system 200 is organized into a plurality of layers of a networked computing environment comprising a coordinator 212 and an orchestrator 220. As detailed further below, components of coordinator 212 are in communication with components of orchestrator 220 via a network. The network may be any suitable network or combination of networks and may support any appropriate protocol suitable for communication of data to and from components of coordinator 212 and orchestrator 220 via the cloud and between various other components in the networked computing system 200. The network may include a public network (e.g., the Internet), a private network (e.g., a network within an organization), or a combination of public and/or private networks. The network may be configured to provide communication between various components depicted in the various figures.

The network may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cellular networks, satellite, licensed radio, or a combination of cellular, satellite, licensed radio, and/or unlicensed radio networks.

System 200 may support multiple layers, such as, for example, a presentation layer 223, an application layer 209, a framework layer 225, a platform layer 227, and an avionics layer 229, as shown. In Aerospace Internet of Things (AIoT) systems, AIoT providers may direct their focus toward connecting onboard avionics devices, extracting data from those devices, and sending the data to the cloud for analytics with the help of one or more onboard IoT gateways (e.g., gateway connector library of the avionics SDK factory 228*a-n*, other gateway SDKs 236 of the avionics layer 229, etc.). In one embodiment, the presentation layer 223 of system 200 includes a plurality of graphical user interfaces (GUI) of applications 202, 204 (e.g., an umbrella application GUI), 206, as well as avionics GUI templates 208. The presentation layer 223 and application layer 209 can include the application associated with system 200 and features hosted therein, including the GUI for a user to interact with the application as well as the business logic of the application. Additional UI features can be added at any time as detailed in the reference architecture The application layer 209 can include one or more hosted applications 214, 216, 218 with corresponding logic and concrete data objects. In some aspects, applications 214, 216, 218 may perform business logic on data streams. Communication between components of the presentation layer 223 (e.g., application GUIs 202, 204, 206) and components of application layer 209 (e.g., applications 214, 216, 218) may be performed using coordinator 212 via the network, which may include use data and security communications.

A connected avionics system, such as that described herein, may have the data stream injected into gateways from multiple onboard avionics subsystems, such as FMS 30, an enhanced ground proximity warning systems (EGPWS), a weather radar, a brakes systems (not depicted), etc. for data transfer to cloud-based analytics. In this respect, orchestrator 220 may be configured to push and pull information from applications 214, 216, 218, for example, upon receipt of instructions from users of application GUIs 202, 204, 206, 208. In some aspects, hosted application 214 can push data objects from orchestrator 220 and/or pull data from data sources in communication with orchestrator 220 (e.g., avionics data such as FMS, 4D flight plan, ground- or aircraft-based traffic management systems, etc.). Orchestrator 220 in turn can be in communication with an object factory 222 of the framework layer 225, which creates the interface for data objects.

The framework layer 225 can be communicatively coupled between the SDKs of platform layer 227 and the applications of the application layer 209 and function as a standard interface that all SDKs can expose. In some aspects, the framework layer 225 creates concrete instances of the SDKs, managing the number of objects created. The object factory 222 can be communicatively coupled to components of the platform layer 227. For example, object factory 222 can be configured to handle objects from the avionics SDK factory 228*a-n*, user interface (UI) SDKs 230*a-n*, and platform support services 232*a-n*. Avionics SDK factory 228*a-n* can include SDKs related to cFMS, RADAR, wheels and brakes, speech, connected FMS, RADAR, gateway connectors, and the like. UI SDKS 230*a-n* can include maps widgets, pages widgets, forms widgets, and/or the like. Platform support services 232*a-n* can include components related to license management, identity and access management, certificate management, launch darkly, cloud connectors, logging and application dynamics, support libraries and the like. In some aspects, platform support services 232*a-n* can be communicably connected to gateway devices, such as connected gateway devices.

Platform layer 227 can contain all of shared SDKs of the system 200, whereby the shared SDKs contain all the connectivity to external devices and any other content that can be shared across applications. Components of avionics SDK factory 228*a-n* can include hosted SDKs for avionics and/or flight management such as Flight Management Systems, Enhanced Ground Proximity Warning System (EGPWS), Traffic Collision Avoidance System TCAS, Weather or RADAR Systems, electronic flight bag (EFB) devices, wheels, connected FMS library, speech models, gateway connector libraries, etc. It is understood that these hosted SDKs can be software entities which can be included to generically manage interfaces and connections, provide access to engines, and host other shareable features. Avionics SDK factory 228*a-n* can be communicatively coupled to the avionics layer 229, including components thereof. For example, avionics SDK factory 228*a-n* can be configured to connect with the avionics layer 229 and receive components therefrom. In some aspects, content to be shared that does not exist within a predetermined SDK can be encapsulated within a SDK wrapper. Such SDKs can come prepacked within platform layer 227 and provide core capabilities that can be required by an application (e.g., data logging, connection to both avionics and the cloud, data management, security management, etc.).

Components of the avionics layer 229 can include SDKs of aircraft servers (e.g., ADG400 SDK 234) as well as other gateway SDKs 236. SDKs of aircraft servers can in turn be communicatively coupled (e.g., SDKs of aircraft servers can filter and convert complex avionics data into various streaming formats such as JavaScript Object Notation (JSON), Extensible Markup Language (XML), etc.) and transmit the converted avionics data to various client applications with avionics data processing service (ADPS) gateway 238. ADPS gateway 238 can serve as a point of entry between system 200 as well as a point of entry for a group of micro-services, such as the connected FMS micro-services 240, takeoff-and-landing data systems (TOLD) 242, and/or the like. ADPS gateway 238 may be, for example, configured to be updated each time a new micro-service is added or removed in the connected FMS micro-services 240. ADPS gateway 238 may be implemented as hardware, software, and/or a combination of hardware and software.

A key attribute of the IFD of system 200 is the ability to add additional content as plugins to the existing application, providing extensibility, flexibility, and isolation of application features and customs processing logic. Therefore, in addition to object factory 222, a plugin manager can be communicatively coupled to orchestrator 220, whereby plugin manager can be in communication with registration store. In particular, system 200 includes components of the platform layer 227 and orchestrator 220, including object factory 222, plugin SDK 332*a-n* and new SDKs 334*a-n* to plug-in, as shown in FIG. 4A and FIG. 4B. In so doing, platform layer 227 (e.g., orchestrator 220) in concert with coordinator 212 enables system 200 to provide an umbrella application that can be found in an app store and once installed enables the purchase and use of additional hosted apps as they become available. For example, newer applications can be readily added at the application layer 209 and/or presentation layer 223.

One or more rules engines of the system may be highly customizable frameworks for complex event processing. The term "engine" as used in this disclosure is understood as a self-contained piece of business functionality with interfaces contained within a hosted SDK (e.g., a microservice). Some non-limiting examples of engines contemplated for use with system 200 and related methods of this disclosure can include an Avionics Engine, a Flight Management Engine (FME), Takeoff and Landing Engine (TOLDE), a Navigation Database Engine, as well as higher order content as a flight plan comparator utility. This enables efficient data filtering where patterns of incoming data are dynamic in nature. It not only helps in reducing the quantity of data but also ensures the quality of data being pushed to the cloud.

The herein discussed rules engine(s) may be used as a framework for building event-based workflows. The rules engine may include one or more of three main components: a message component, e.g., any incoming event; a rules node; and/or a rules chain. The message may refer to incoming data from devices, device life-cycle event, REST API event, RPC request, etc. The rules node may be a function that would be executed on an incoming message. There are many different node types that can filter, transform, and/or execute some action on incoming message. The rules chain may be nodes relate to each other with relations, so the outbound message from rule node is sent to next connected rule nodes.

Below are some common use cases for configuring rule chains: data validation and modification for incoming telemetry or attributes before saving to the database; copy telemetry or attributes from devices to related assets so you can aggregate telemetry, e.g., data from multiple avionics subsystems can be aggregated in related asset; create/update/clear alarms based on defined conditions; trigger actions based on edge life-cycle events, e.g., create alerts if device is online/offline; load additional data required for processing, e.g., load temperature threshold value for a device that is defined in device's customer or tenant attribute; trigger REST API calls to external systems; raise alarms/alerts when complex event occurs and use attributes of other entities inside email template; and/or consider user preferences during event processing. In some aspects, messages transmitted from system 200, such as triggers and/or alerts, can be configured for transmitting information to flight crew and ground controllers for maintenance preparations reducing the aircraft-on-ground (AOG) times. System 200 can also be configured to detect near misses can also be configured in the IFD to build a trend model for early detection of anomalies before faults or malfunctions occur increasing safety.

Figure 5A:
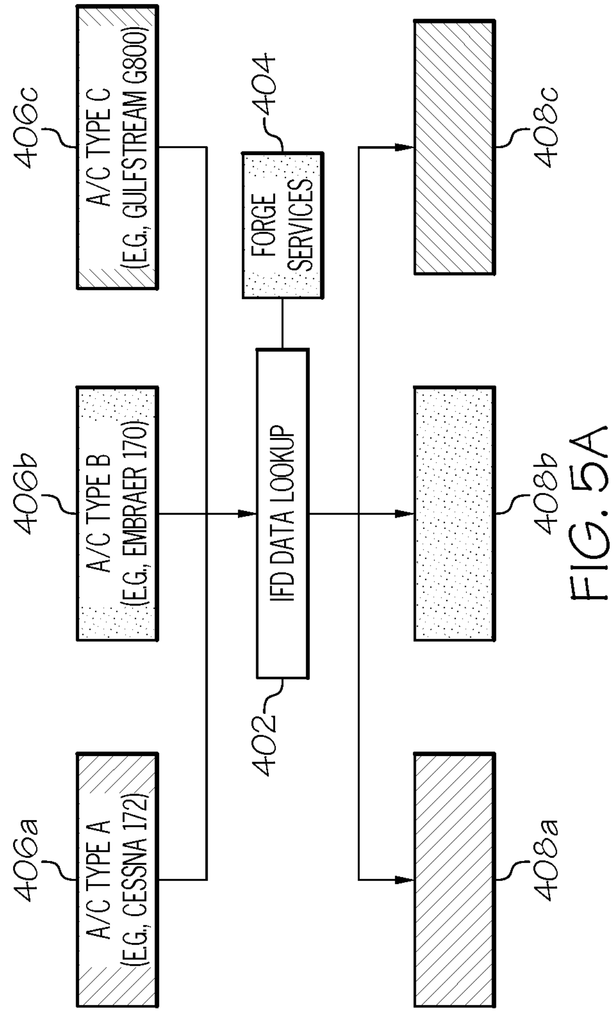
FIG. 5A depicts a schematic showing customizable application behavior based on multiple aircraft classes.
Figure 5B:
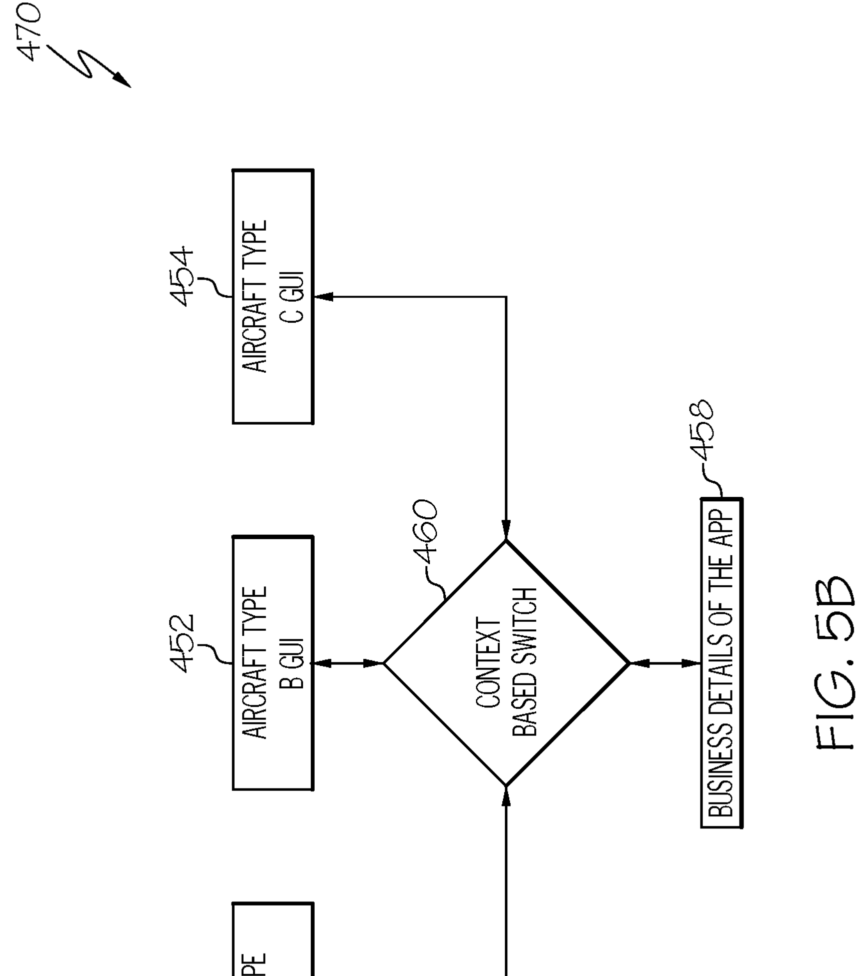
FIG. 5B depicts multiple aircraft classes customizable to a single app based on business details of the application.

FIG. 5A depicts a system architecture for providing context-specific, situation-aware integrated flight deck GUIs to a user. The system includes an IFD data lookup module 402, which is connected to an external services module 404. The external services module 404 includes all the software and various hardware necessary to provide context-specific GUIs to the user. The IFD data lookup module 402 may receive the necessary information from the external services module 404 and may cause customized and context-specific information to be displayed on a display 406*a*, 406*b*, and 406*c* of the user based on the type of aircraft and the current aircraft situation (e.g., altitude, speed, etc.) 408*a*, 408*b*, 408*c* in which the display is operating as explained in greater detail herein. In embodiments, the context-specific GUIs may include one or more default settings, which default settings may affect the information displayed based on the selected aircraft type. For example, a display may show various feature sets based on what aircraft type the GUI is based on (e.g., AC Type A: Satellite map overlays on 2D Map, AC Type B: Synthetic Vision System, Departure/Arrival Procedure selector, AC Type C: 3D AMM display with taxi routes, 3D Approach Preview, Oceanic Tracks). As another example, the aircraft type or classification may affect information displayed based on one or more aircraft functions (e.g., AC Type A: Large airports (e.g., KPHX) will be removed and priority will be given to small airports and unpaved runways based on small size of AC Type A but when IFD detects emergency condition from the aircraft data, even large airports may be displayed, AC Type B: Unpaved runways may be removed based on landing gear settings of the AC, AC Type C: Only runways with required runway length are displayed based on a size of the runway). As another example, in some embodiments, the context-based display may cause changes to the map display (e.g., AC Type A may default to VFR, roads, railroad's layer, AC Type B may default to low altitude airways, AC Type C may default to high altitude airways/charts). In some embodiments, the default settings may be based on, for example, one or more IFD controls (e.g., AC Type A may default to native iPad/Android controls, AC Type B may default to mimic multi-function control and display unit (MCDU) controls, AC Type C may default to one or more onboard touch screen controller control settings). As an example of weather information displayed on the various displays, the default settings may change between the various displays (e.g., AC Type A may default to display surface winds, sigmets/Airmets, and/or TFR's based on the altitude at which it operations (i.e., relatively low), AC Type B may default to displaying information regarding hail, icing, lightning, NexRad, etc., AC Type C may default to displaying a high altitude winds and/or satellite weather for a large geographical area based on its long flight capabilities). In yet other embodiments, default settings could be based on, for example, one or more performance capabilities (e.g., AC Type A could display a basic takeoff and landing performance calculator, AC Type B could display more advanced takeoff and landing information such as, for example, equal time point, point of no return, in air graphical flight planning, AC Type C might display, for example, an altitude advisor, a graphical route advisor, a runway contaminant analysis, etc.) In some embodiments, the aircraft classification could be based on a registration number of the aircraft and aircraft engine information, for example, what types of engines and a number of engines that are on the aircraft. In yet other embodiments, the aircraft classification could be based on one or more characteristics of the aircraft, such as an aircraft class, a tail number, and a type of aircraft engine system FIG. 5B depicts an application 470 with its various GUIs abstracted from the business logic 458 of the application, which may enable the business logic of the application 470 to be displayed across the multiple GUIs in a format specific to the GUI. The application 470 may include multiple modules or layers with well-defined interfaces between each. The GUIs shown in FIG. 5B correspond with various aircraft types. A first GUI 450 may correspond with an aircraft type A (e.g., a Cessna 172 class), a second GUI 452 may correspond with an aircraft type B (e.g., an Embraer 170), a third GUI 454 may correspond with an aircraft type C (e.g., a Gulfstream G800). The application 470 may switch between the various aircraft GUIs as shown by the context-based switch 460. The GUIs could be built on various design patterns, such as, for example, a Model View Controller (MVC) pattern, Model View Presenter (MVP) pattern, Model View View-model (MVVM) pattern, Model-View-Delegate (MVD) pattern, or another pattern that provides a sufficient level of abstraction. The GUIs may be built to follow a paradigm of an aircraft in which the application would be used (e.g., on a portable device displaying the GUI connected to an on-aircraft network). The GUIs could include the look and feel of any portion of the aircraft, for example, the entire cockpit or any portion thereof. The GUIs could be developed using, for example, a complementary language such as HTML, CSS, and JavaScript for developing the front-end applications, which may be developed as one or more web apps while the application 470 may be developed using a different languages with an API between the application 470 and the GUIs. The GUI used to display the output of the business logic may be selected by connecting with a given aircraft's on-board network, determining a unique identity of the aircraft, receiving details of the aircraft from a network server, selecting the appropriate GUI from a number of different GUIs, and causing the selected GUI to be displayed on a device of the user or based on an input from a user, for example.

Figure 6A:
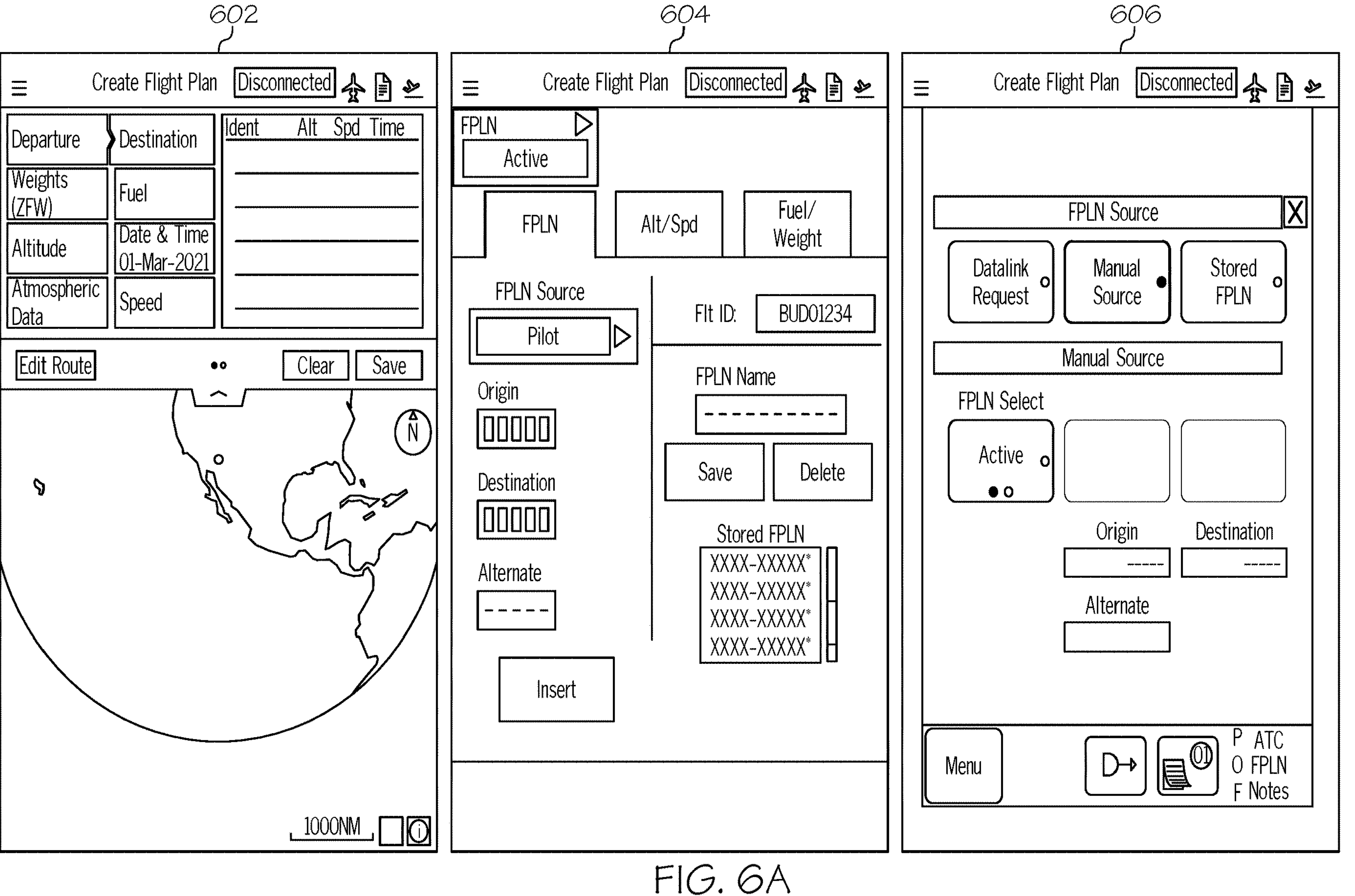
FIG. 6A depicts various aircraft settings for display in a customizable application.
Figure 6B:
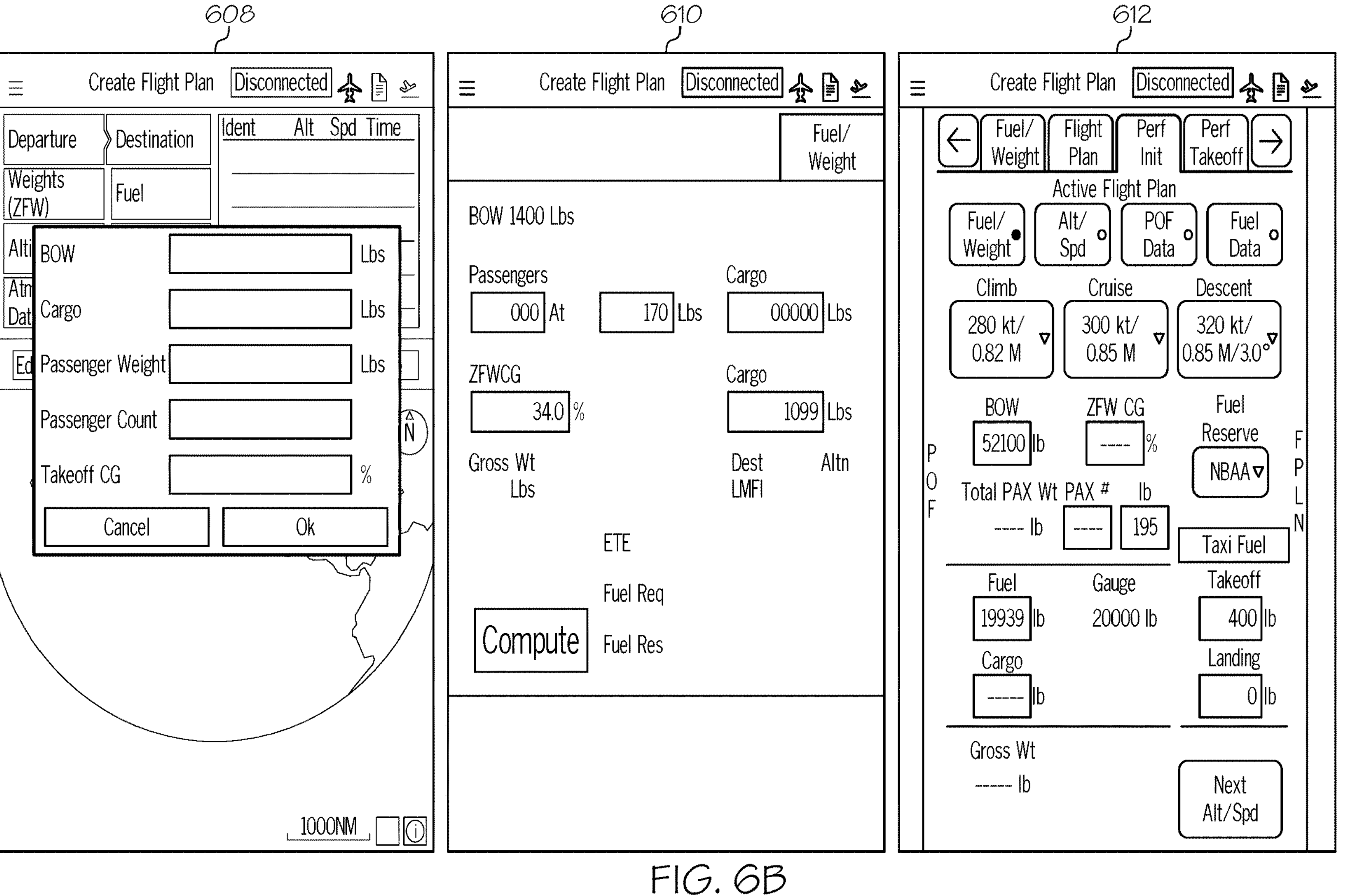
FIG. 6B further depicts various aircraft settings for display in a customizable application.

FIG. 6A depicts an exemplary screen of a GUI for planning a flight and includes a first screen 602, a second screen 604, and a third screen 606. One or more of the first screen 602, the second screen 604, and the third screen 606 could be displayed on an input/output display device (e.g., the PED 50). The first screen 602 may display flight planning function including one or more flight maps. The second screen 604 may include one or more inputs for updating the flight plan of the first screen 602. For example, the flight planning tool may include an "origin," a "destination," and a "flight plan name" selector as well as various other functionality for planning a route. The third screen 606 can include various other selectors, such as, for example, selectors for determining a flight plan source. FIG. 6B depicts various other screens for inputting information such as a fourth screen 608 for editing a flight plan with weight information, a fifth screen 610 for entering fuel/weight information to a flight planner, and a sixth screen 612 for selecting which details of a flight plan to enter.

Figure 7:
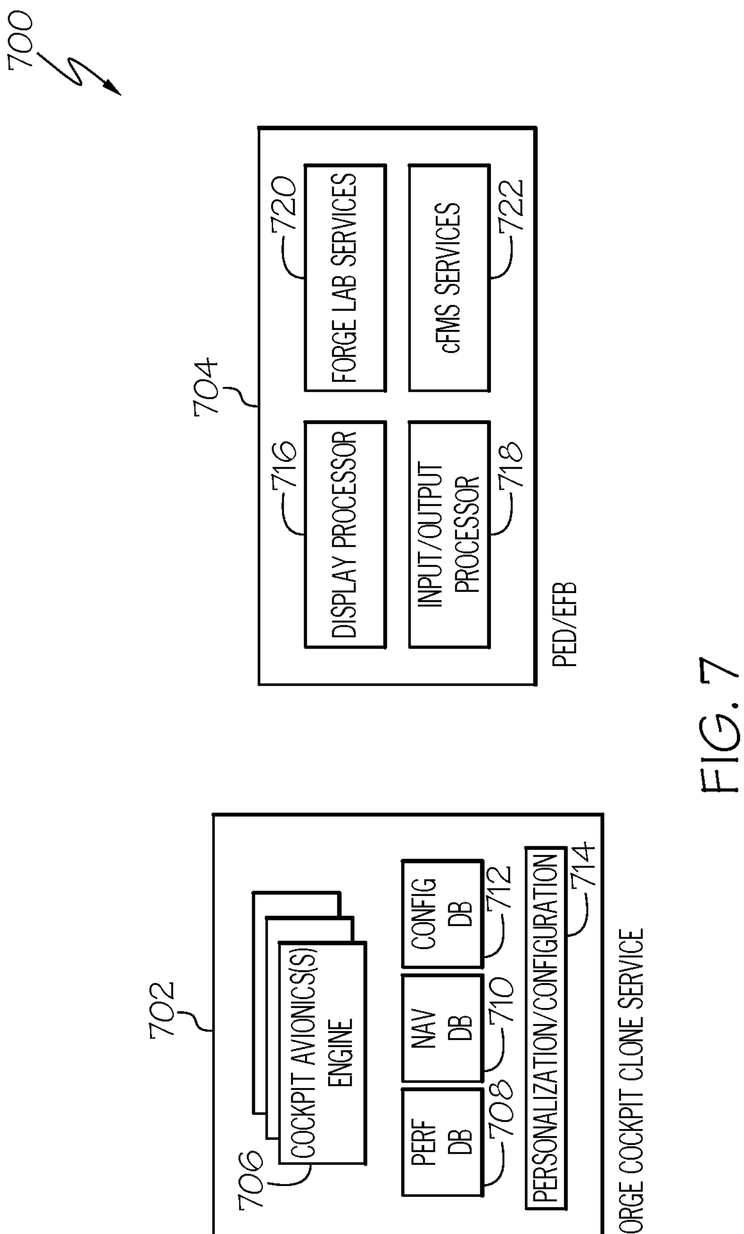
FIG. 7 depicts a system architecture for providing various customizable cockpit displays.

FIG. 7 depicts a system architecture 700 for providing one or more avionics engine clones for—aircraft and a PED, which PED may be configured to display and receive inputs/outputs to an EFB. The functions of the PED/EFB module 704 may be performed on the PED, which PED may connect to the network for providing data thereto. The network services module 702 can include a cockpit avionics engine 706, a performance database 708, a navigation database 710, a configuration database 712, and a personalization/configuration module 714. The PED/EFB module 704 can include, for example, a display processor 716, an input/output processor 718, an external network lab services module 720, and a connected FMS services module 722. In embodiments, an actual aircraft cockpit may be depicted on the PED suing the same or similar display units (PFD, ND, INAV), multi-control display units, and/or touchscreen control based on the cockpit of a user of the PED. The PED can thus provide a consistent user interface with a cockpit that will be used by the user (e.g., a pilot user) and mimic the computational logic of the avionics systems connected to the actual cockpit (e.g., the FMS). Hence, any data computed using the PED/EFB module 704 will match the computed data in the actual avionics systems. Additionally, once planned and reviewed, aircraft crew can save flight plan, fuel/load, airport, configuration, etc. data in the application and instantly transfer it to a cockpit when connected to on-board networks or connected to systems connected to on-board networks with the PED.

Figure 8:
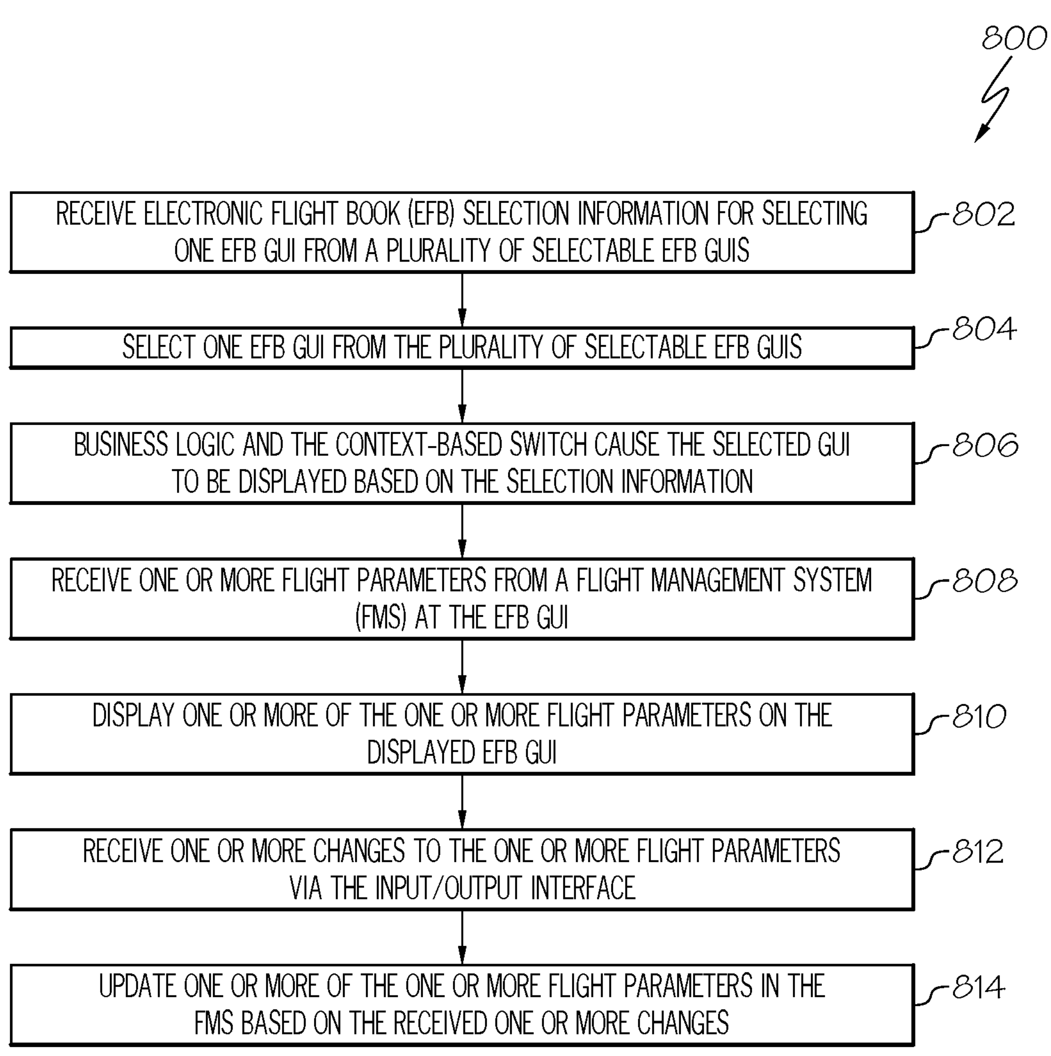
FIG. 8 is a method of providing customizable cockpit displays.

FIG. 8 shows a method 800 of updating one or more flight parameters in a FMS based on one or more changes received from a context-based cockpit on an external device. It is to be understood that the method 800 is not limited to the steps and features explicitly listed therein and that modifications including additional or fewer steps and/or features are within the scope of the various embodiments described herein.

At step 802, the system may receive electronic flight book (EFB) selection information for selecting one EFB GUI from a plurality of selectable EFB GUIs that provide an interface for the entry and display of flight information and are stored in the memory. The plurality of EFB GUIs may correspond to one or more EFBs for particular aircraft, similar to the particular GUIs or the various aircraft shown in FIG. 5A above. Each of the EFB GUIs may be selectable based on, for example, a valid subscription to a subscription-based service for providing various EFB GUIs. Selection information can include a manual selection by an user of the EFB GUI (e.g., a pilot or crew of a particular aircraft may select that particular aircraft's GUI) or by one or more other criteria. For example, a PED running the EFB GUI application may connect with a network aboard the aircraft and identifying information stored on the aircraft's network (e.g., MAC addresses, IP addresses, tail numbers, etc.) may serve as selection information. In some embodiments, the PED may have a camera and the user of the PED may capture an image of the aircraft and the aircraft image may be received as selection information.

At step 804, based on the selection information one EFB GUI may be selected from the plurality of selectable EFB GUIs. For example, the user's selection data may be used to select the appropriate EFB GUI or image recognition algorithms could be used to determine a class/make/model of the aircraft based on image data from the camera of the PED and the appropriate GUI may be selected. The selected EFB GUI would correspond to the GUI displayed on the systems in aircraft in which the crew using the EFB GUI would operate such that there is no gap in knowledge and/or efficiency when transitioning from the cockpit to the remote PED and vice versa. They crew can essentially perform all the operations and input all the data on the PED that they would otherwise in the cockpit or using other systems in the aircraft. As shown in FIGS. 5A/5B the business logic of the EFB application can be stored remotely or separately from the GUIs themselves and the selected GUI can display the data stored in and effected by the business logic. In some embodiments the switch between the various GUIs may occur automatically.

In some embodiments, the business logic and other details of the app may be stored remotely from the device on which the GUI is displayed. For example, with brief reference to FIG. 5A, the business logic of the application may be stored in a remote services module 404 and may be uploaded to the particular remote device when the context-based selection is made such that the remote device can display any particular aircraft EFB based on the context. The IFD data lookup module 402 may use the selection information to select the appropriate EFB GUI from the various stored EFB GUIs in the network services module 404. In some embodiments, there may be one or more user access modules or access and identity modules (not shown) which may verify access and permissions to the remote services module 404 before any EFB GUI is displayed.

At step 806, the business logic and the context-based switch may cause the GUI selected based on the selection information to be displayed. The GUI may be displayed, for example, on a display of a PED or in a cockpit of the aircraft that the EFB GUI mimics. With brief reference to FIG. 6A and FIG. 6B, the GUI may display information such as, for example, one or more charts, maps, or graphs, a departure location, a destination location, a fuel load, a weight location, a cargo load, a passenger load, aspects of a flight plan such as, for example, a climb, cruise, and descent plan, a takeoff and/or landing plan, and other data and metadata about the flight plan and related data. In some embodiments, the GUI may be configured to display the information on a remote device (e.g., a PED) equivalently to the way it would be displayed locally on one or more cockpit displays or other displays in the aircraft. For example, if the systems in the aircraft would display a flight plan including one or more dynamic graphics (e.g., following a depicted plane), the same dynamic graphics may be displayed on the remote EFB.

At step 808, the EFB GUI may receive one or more flight parameters from a flight management system (FMS). For example, the EFB GUI may be displayed on a PED that is connected to a network such as the network 10 of FIG. 2 or may be connected to one or more on-aircraft network servers such as the network server 40 of FIG. 2. As discussed in greater detail herein, the FMS may receive various data from the onboard avionics (especially as discussed with respect to FIG. 3). The EFB GUI may receive the avionics system data and/or one or more flight planning and preparation parameters. For instance, if the aircraft is currently on the ground waiting to begin taxiing for takeoff at JFK Airport, the FMS may receive an aircraft location signal from a GPS system and such signal may be sent by the FMS to the EFB GUI where it may be received for display by the EFB GUI.

At step 810, the system may display one or more of the one or more flight parameters on the displayed EFB GUI. As mentioned above, the EFB GUI may be designed as a replica of the actual screens available to the crew of the aircraft in the cockpit or other operational location of the aircraft. To continue with the example above, the EFB GUI may receive the location signal and display a location on a chart or map of the EFB GUI (see, for example, FIGS. 6A and 6B). In some embodiments, the displayed flight parameter is a default parameter that is selected and displayed based on the real time context. For example, the displayed parameter may be an airport that includes runways beyond a required length for a particular type of aircraft. For example, the aircraft may be a Boeing 777 and may require a runway of over XXX feet in order to land, per regulation. The default display parameter may be to filter out runways with a length of less than XXX feet such that the display is not cluttered with unnecessary information. However, if the aircraft can land at any length runway, the default setting may be to display all airports, regardless of runway length because the aircraft can land at any airport. Similarly, if the aircraft has a special purpose (e.g., crop spraying, aerial search and rescue, etc.), only airports which facilitate landing by such aircraft may be displayed. The default settings are alterable by a user to display more or less or different information than would be displayed with the default setting (e.g., in the case of emergency, alternate flight planning, etc.)

At step 812, the system may receive one or more changes to the one or more flight parameters via the input/output interface. For example, a user may input one or more changes to a flight plan via the EFB GUI using a touchscreen of the PED. For example, with brief reference to FIG. 6A, the user may change an origin and/or a destination using the EFB GUI. Once the changes are made in the EFB GUI using the PED, the changes to the flight plan may be visible, for example, in an actual cockpit of the aircraft as if the user had updated the flight plan in the actual cockpit. Because the two interfaces are equivalent or at least similar, there may be little to no loss of efficiency when transferring between the two interfaces, saving the crew of the aircraft training and operational hours and improving efficiency.

At step 814, the system may update one or more of the one or more flight parameters in the FMS based on the received one or more changes. The changes to the flight plan may be used to update the FMS of the aircraft associated with the selected EFB GUI. For example, the FMS may be updated with a new origin and/or destination to automatically plan a route from the origin to the destination. As another example, the FMS may be updated using the EFB GUI with one or more weight parameters (e.g., a fuel weight, a passenger weight, a cargo weight, a ZFWCG, etc.) Since many of the systems on the aircraft may be automated based on the FMS, the avionics systems and sensors may be automatically updated on the ground, in flight, or in another status (e.g., maintenance) using the EFB GUI in the PED. Hence, a user may update one or more flight parameters and control various automatic systems of the aircraft to meet the parameters using the EFB GUI.

Figure 9:
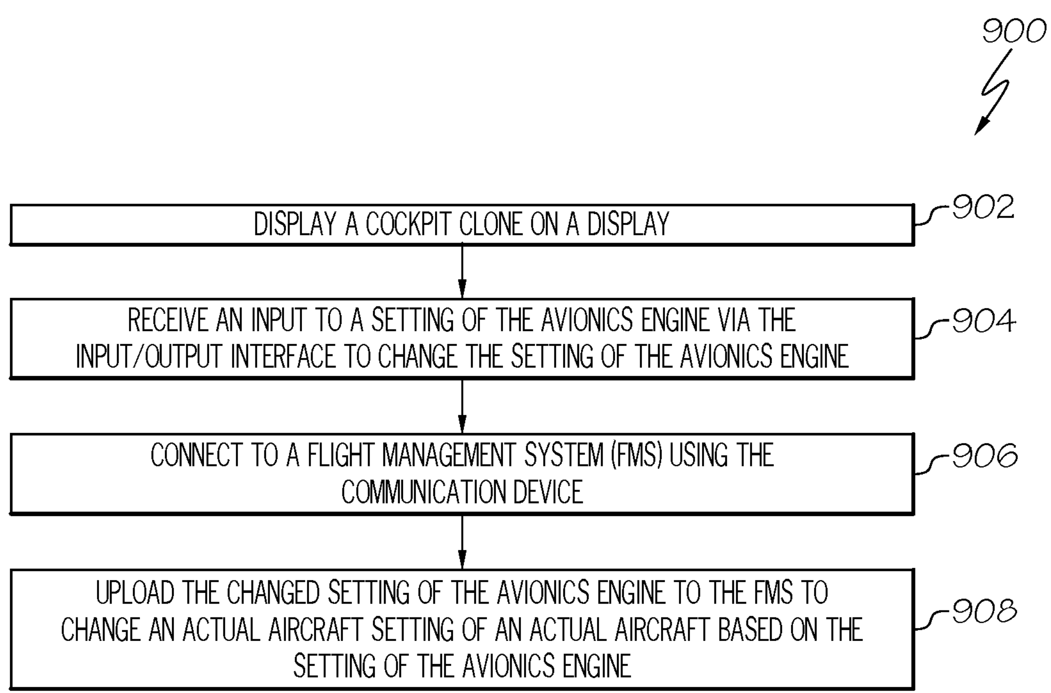
FIG. 9 is another method of providing customizable cockpit displays.

FIG. 9 shows a method 900 of uploading one or more changed settings of an avionics engine to a FMS to change an actual aircraft setting of an actual aircraft based on the setting of the avionics engine. It is to be understood that the method 900 is not limited to the steps and features explicitly listed therein and that modifications including additional or fewer steps and/or features are within the scope of the various embodiments described herein.

At step 902, the system may display a cockpit clone on a display. The display may be, for example, a display of a PED or of a monitor connected to a computing device (e.g., desktop, laptop, etc.) The cockpit clone may be configured to change settings of an avionics engine as explained in greater detail herein. Additionally, the cockpit clone may be a visual representation of an actual cockpit of an aircraft. For example, with reference to FIG. 1, the cockpit clone may clone one or more of the displays 12 of the cockpit 10 on a PED, monitor, etc. For example, with brief reference to FIG. 1 and FIG. 6A, the displays 602, 604, and 606 may be clones, complete with input/output capabilities of the displays 16*a*, 16*b*, and 16*c* of FIG. 1. Accordingly, the pilot, crew member, or other user can access and perform one or more functions via the PED portably (e.g., from a passenger section, from a standby seat in the cockpit, from a remote location (e.g., hotel room), etc.)

At step 904, the system may receive an input to a setting of the avionics engine via the input/output interface to change the setting of the avionics engine. For example, with reference to FIG. 6A, the system may receive a "Departure Location," a "Destination Location," and amount of "Fuel," and other information associated with creating a flight plan, which flight plan information may be used by the aircraft systems to cause one or more physical changes to systems aboard the aircraft during flight operations and supporting operations (e.g., taxi, maintenance, etc.) The input can come from the PED via, for example, the input/output device (e.g., touchscreen) or some other input. Because the input can be completed remotely from the PED, the crew and other users may be able to input information at a more efficient time, reducing inefficiencies associated with flight preparations when in the cockpit.

At step 906, the system may connect the EFB application displayed on the PED to a flight management system (FMS) of an aircraft that is to be flown using the communication device. For example, with brief reference to FIG. 2, the PED 50 may connect to the FMS 30 via the network 10. Because the EFB displayed on the PED 50 will appear similarly to the actual EFB that would be displayed in a cockpit of the aircraft 20, the crew inputting information using the virtual EFB will be more efficient entering information into the FMS 30 using the virtual EFB 30. The FMS 30, which may control various aircraft functions throughout the eventual flight, will less often receive inaccurate information minimizing human error and flight inefficiencies. The PED 50 can connect to the network via, for example, one or more of the routers on the aircraft or an internet portal, for example, in the case of a web-based server.

At step 908, the system may upload the changed setting of the avionics engine to the FMS to change an actual aircraft setting of an actual aircraft based on the setting of the avionics engine. With brief reference to FIG. 2, one or more of the systems on the aircraft 20 could be effected by such change. For example, the FMS 30 may cause the landing gear to deploy at the end of a descent stage of a flight or may cause the engines to shift to a more efficient fuel burning mode during a cruise portion at a particular altitude (which may be determined based, for example, a flight plan).

It should now be understood that customized EFBs may be displayed for planning on a remote device, for example, a personal electronic device (PED) and may be used by aircrews for inputting critical regulatory, flight planning, and other information in preparation for and during a flight. Such customized EFBs may reflect the physical appearance of an actual aircraft on which a crew operates and inputting information into the customized EFB can have an actual effect on the systems of the aircraft via a connection between the virtual EFB and an FMS of the aircraft. Accordingly, crews of aircraft can utilized customized EFB tools to be virtually present in any cockpit for an aircraft they will operate, which may result in a reduction in required training on any given cockpit, more effectual utilization of remote devices, and a decreased likelihood of crew errors in an actual aircraft.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

a communication device, a display, an input/output interface, a processing device, and a memory, storing one or more instructions that when processed by the processing device, cause the system to:

receive electronic flight book (EFB) selection information for selecting one EFB GUI from a plurality of selectable EFB GUIs that provide an interface for entry and display of flight information and are stored in the memory, wherein each of the plurality of selectable EFB GUIs is a clone display of an actual cockpit of one aircraft of a plurality of aircraft that displays information on the clone display in a format and layout consistent with a presentation in the actual cockpit;

select one EFB GUI from the plurality of selectable EFB GUIs based on the received EFB selection information;

display the selected EFB GUI on the display;

receive one or more flight parameters from a flight management system (FMS);

display one or more of the one or more flight parameters on the displayed EFB GUI;

receive one or more changes to the one or more flight parameters via the input/output interface; and update one or more of the one or more flight parameters in the FMS based on the received one or more changes.

2. The system of claim 1, wherein the information displayed on the clone display is customizable based on one or more customizable display settings of a user.

3. The system of claim 1, wherein the information displayed on the clone display is also displayed in the actual cockpit of the aircraft.

4. The system of claim 3, wherein one or more user preferences for displaying information on the clone display are used to update the user preferences in the actual cockpit of the aircraft.

5. The system of claim 1, wherein the clone display is driven by an avionics engine that simulates one or more avionics systems of the aircraft such that onboard processes of the aircraft are simulated on the clone display.

6. The system of claim 1, wherein the EFB GUI is selected based on one or more characteristics of an aircraft in which the system will be used.

7. The system of claim 6, wherein the characteristics include an aircraft class, a tail number, and a type of aircraft engine system.

8. The system of claim 1, wherein the EFB selection information is based on a user input.

9. The system of claim 1, wherein the plurality of selectable EFB GUIs are built on one or more of a Model View Controller (MVC) pattern, a Model View Presenter (MVP) pattern, and a Model View View-model (MVVM) pattern.

10. A system comprising:

a communication device, a display, an input/output interface, a processing device, and a memory, storing one or more instructions that when processed by the processing device, cause the system to:

display a cockpit clone on the display, wherein the cockpit clone is configured to change settings of an avionics engine and is a visual representation of an actual cockpit of an aircraft, wherein a selection of the cockpit clone displayed on the device is based on one or more of a user input and a classification of an aircraft on which the system is used;

receive an input to a setting of the avionics engine via the input/output interface to change the setting of the avionics engine;

connect to a flight management system (FMS) using the communication device; and upload the changed setting of the avionics engine to the FMS to change an actual aircraft setting of an actual aircraft based on the setting of the avionics engine.

11. The system of claim 10, wherein the classification of the aircraft on which the system is used is based on a registration number of the aircraft and an aircraft engine information.

12. The system of claim 10, wherein the avionics engine is a replica of one or more avionics systems aboard the actual aircraft.

13. The system of claim 10 wherein the communication device, the display, and the input/output interface are on a personal electronic device and the personal electronic device is configured to connect to a network aboard the actual aircraft.

14. The system of claim 10, wherein the avionics engine is hosted on an external network and the communication device connects the system to the external network using one or more secure protocols.

15. A method comprising:

receiving electronic flight book (EFB) selection information for selecting one EFB GUI from a plurality of selectable EFB GUIs that provide an interface for entry and display of flight information and are stored in a memory, wherein each of the plurality of selectable EFB GUIs is a clone display of an actual cockpit of one aircraft of a plurality of aircraft that displays information on the clone display in a format and layout consistent with a presentation in the actual cockpit;

selecting one EFB GUI from the plurality of selectable EFB GUIs based on the received EFB selection information;

displaying the selected EFB GUI on the display;

receiving one or more flight parameters from a flight management system (FMS);

displaying one or more of the one or more flight parameters on the displayed EFB GUI;

receiving one or more changes to the one or more flight parameters via an input/output interface; and updating one or more of the one or more flight parameters in the FMS based on the received one or more changes.

16. The method of claim 15, wherein the information displayed on the clone display is also displayed in the actual cockpit of the aircraft.

17. The method of claim 16, wherein one or more user preferences for displaying information on the clone display are used to update the user preferences in the actual cockpit of the aircraft.

* * * * *